United States Patent [19]

Conrad

[11] 4,327,489
[45] May 4, 1982

[54] DOUGH CUTTER WITH INTERCHANGEABLE CUTTING ELEMENTS

[75] Inventor: Jeff Conrad, Hoffman Estates, Ill.

[73] Assignee: The Pillsbury Company, Minneapolis, Minn.

[21] Appl. No.: 114,768

[22] Filed: Jan. 23, 1980

[51] Int. Cl.³ .............................................. B26B 3/00
[52] U.S. Cl. ........................................ 30/299; 30/315; 425/298
[58] Field of Search ................. 30/299, 305, 315, 314; 425/298

[56] References Cited

U.S. PATENT DOCUMENTS

| | | | |
|---|---|---|---|
| 735,727 | 8/1903 | Woody | 30/305 |
| 1,446,513 | 2/1923 | Morris | 30/305 |
| 1,572,191 | 2/1926 | Donnelly | 30/299 |
| 1,618,685 | 2/1927 | Stauffer | 30/305 |
| 2,245,770 | 6/1941 | Franzmann | 30/315 |
| 2,586,823 | 2/1952 | Huhn | 30/305 |
| 2,602,225 | 7/1952 | Hyde | 30/305 |
| 2,820,423 | 1/1958 | Catuccio | 425/298 |
| 4,243,038 | 1/1981 | Harnick | 30/305 |

Primary Examiner—Nicholas P. Godici
Assistant Examiner—J. T. Zatarga
Attorney, Agent, or Firm—Robert J. Lewis; Michael D. Ellwein

[57] ABSTRACT

A dough cutter comprising a handle for grasping by a user. The handle has apparatus for limiting lateral movement of a cutter. The cutter is comprised of two or more cutting elements which are in side by side relationship and have mating edges. The cutting elements have depending cutting ribs and apparatus for retaining the two or more cutting elements in positional relationship with one another when releasably retained on the base. Retaining apparatus is provided for releasably retaining the cutting element on the base.

8 Claims, 6 Drawing Figures

DOUGH CUTTER WITH INTERCHANGEABLE CUTTING ELEMENTS

FIELD OF THE INVENTION

The present invention relates to a dough cutter having a handle portion for releasably retaining a cutter which is comprised of a plurality of cutting elements which can be interchanged with other cutting elements to form different configurations of cut dough.

BACKGROUND OF THE INVENTION

Dough cutters, and more particularly, cookie cutters, are well known in the art. Typically, they are comprised of a handle portion having a rigid cutting wall with a sharp cutting edge. Generally, they are an integral structure and are designed to make only one shape of cookie. Thus, a cookie maker had to have a wide assortment of cookie cutters in order to make various shapes of cookies or cookies with various designs therein. Not only does this require the purchase of a large number of cutters in order to make an assortment of cookies, it also requires more than necessary storage space which is usually a premium item in most kitchens.

One solution to this problem was proposed in U.S. Pat. No. 1,446,513. It provided for a dough cutter with a plurality of concentrically positioned dough cutting elements which, as disclosed, can be used either individually or in any combination in order to make various shapes of cookies. However, this type of cutter is limited to making different sizes of cookies or cookies with different configurations on the outer peripheral edge or an inner peripheral edge.

The present invention provides a simple dough cutter which can provide a large variety of outer peripheral edge design and a large variety of impressed design on the cookie while still being simple in construction and operation and adapted for inexpensive manufacture, preferably by injection molding.

DETAILED DESCRIPTION OF THE INVENTION

Figure 1:
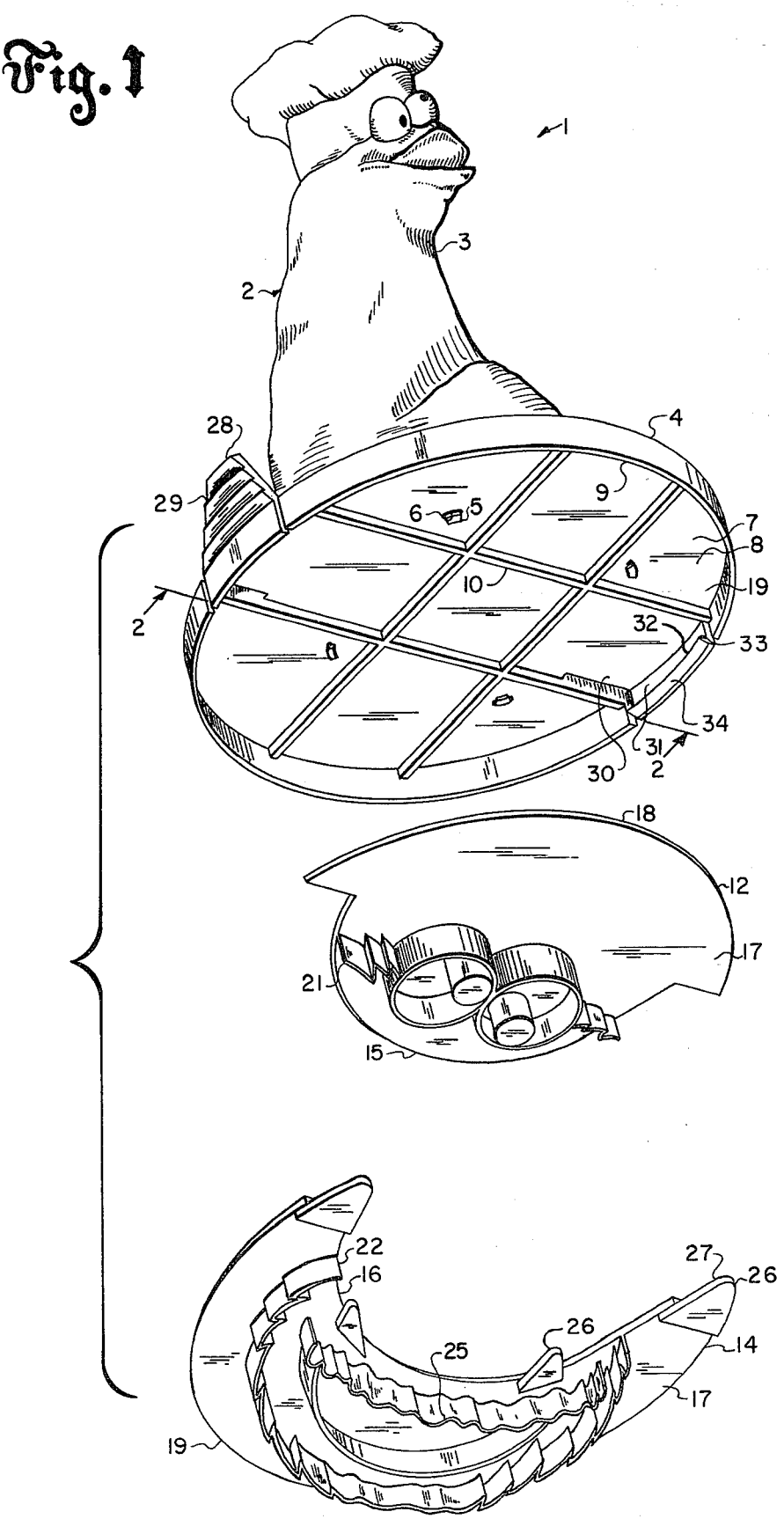
FIG. 1 is an exploded perspective view of a cookie cutter showing its component parts.

The reference numeral 1 designates generally a dough cutter which includes a handle member 2 which is comprised of a hand engaging portion 3 and a base member 4. The handle 3 and base 4 can be integral structure; however, it is currently preferred that they be separate parts to facilitate manufacture and to allow flexing of the base member 4 for a purpose hereinafter described. In the illustrated structure, the handle 3 has a plurality of locking tabs 5 which are each inserted through a respective opening 6 in the base 4. This permits ease of assembly of the handle 2.

The hand engaging portion 3 can be of any suitable shape that is adapted for engagement by the hand of a user and, as illustrated, can assume the shape of a figure that will enhance its appeal to a potential user. The base 4 has a support member 7 which engages the base of the hand engaging portion 3 and preferably is generally planar. As seen, the base 4 has a peripheral rib 9 depending from the support member 7 and generally perpendicular thereto. The rib 9 can extend around the entire periphery of the base 4 or can be such as to depend only from selected portions of the periphery of the base 4. The lower surface 8 can also be provided with a plurality of integral reinforcing ribs 10 projecting therefrom to help rigidify the base 4.

It is preferred that the hand engaging portion 3 and the base 4 be molded from a synthetic plastic resin to give it resiliency and durability while still providing ease of manufacture.

The dough cutter 1 is provided with a multiple piece cutter assembly which in the illustrated structure is comprised of a two-piece cutter with the pieces being indicated by the numerals 12 and 14. In a preferred embodiment of the present invention, the cutting members 12 and 14 are adapted to be positioned in side by side relationship with each having a respective peripheral edge 15 and 16 which have substantially matching contours so as to provide a continuous or substantially continuous downwardly facing surface in operation. The cutting members 12 and 14 also have respective peripheral edges 18 and 19 which preferably conform to the shape of the inside surface of the rib 9. The rib 9 in operation prevents lateral movement of the cutting members 12 and 14 in operation when the cutting members 12 and 14 are positioned within the receptacle 19 defined by the surface 8 and the rib 9. The surfaces 17 of the cutting members 12 and 14 each preferably have a projecting cutting rib 21 and 22, respectively, which projects generally normally from the surfaces 17 and are preferably integral with the respective cutting members 12 and 14. The free edge of the ribs 21 and 22 are sharp to facilitate cutting of dough and preferably the ribs are tapered from the free edge to assist in release of dough from the dough cutter 1.

The ribs 21 and 22 can assume any number of shapes as, for example, decorative faces, figures, animals or the like. In a preferred embodiment of the present invention, the ribs 21 and 22 form faces. It is preferred that the ribs 21 and 22 have their free ends adjacent the edges 15 and 16 and be so positioned as to form a substantially continuous cutting rib when the cutting members 12 and 14 are positioned in the receptacle 19 to provide a complete cut to form the periphery of a cut dough piece. Also extending from at least one of the surfaces 17, in a preferred embodiment, there can be provided figure impressing walls or indicia 25. It is preferred that these walls 25 have a height less than the height of the ribs 21 and 22 so that a cut is not made completely through the dough. However, in the case where a hole is desired to be formed within a cut dough piece, the wall 25 can have a height the same as the ribs 21 or 22.

To assist in holding the cutting members 12 and 14 in positional relation, one of the cutting members can be provided with one or more ears 26. In the illustrated structure, the ears each have a shoulder 27 which is coplanar with and facing opposite to the surfaces 17 so as to be in overlying and engaging relationship with the surface 17 of the other cutting member.

With this design, for example, when faces are the figures to be made, the eye portion cutting member 12 for one face can be interchanged with the eye portion of another cutter to make different faces. Likewise, the mouth portion of a set of cutters can be substituted for another mouth portion and by having the ribs 21 and 22 terminate at about the same positions, complete cuts can be made in the dough while still providing a wide variety of different configurations so that different configurations of dough pieces can be readily made with a minimum of effort on the part of the user.

As best seen in FIG. 1, retaining means are provided to releasably retain the cutting members 12 and 14 within the receptacle 19. Numerous types of retaining means can be provided as is evidenced by the different configurations illustrated in FIG. 1 and FIGS. 3-6. Generally, the retaining means have in common, in the illustrated structures, interengaging shoulders which by resilient movement of either a part of the base 4 or a resilient part of a cutting member 12 or 14, the interengaging shoulders can be moved out of engagement thereby releasing the cutting members 12 and 14 from retention within the receptacle 19.

As seen in FIG. 1, retaining tabs 28 are an integral part of the base 4 and have a finger engaging lug 29 which is integrally and resiliently connected to the remainder of the base by a flexible portion 30 of the support 7. A wall 31 extends from the flexible portion 30 and preferably is generally coextensive with the rib 9. At the free edge of the wall 31, there is provided a latch which is comprised of an inwardly projecting ridge 32 forming a shoulder 33 which is generally parallel to the surface 8 and spaced therefrom. A tapered or inclined surface 34 is also provided to facilitate assembly. The shoulder 33 would be selectively engagable with the surface 17 of the cutting member 14. By virtue of this arrangement, the ears 26 and the ridge 31 hold the cutting members 12 and 14, respectively, in the receptacle 19 in a releasable manner.

Figure 2:
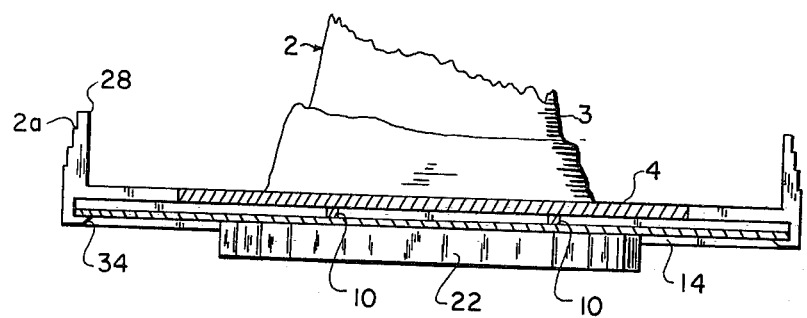
FIG. 2 is a fragmentary sectional view taken along the line 2—2 FIG. 1 with the cutting elements in association with the cutter handle.
Figure 5:
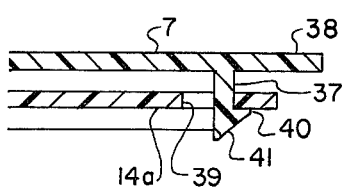
FIG. 5 is a fragmentary sectional view showing details of a modified form of retainer for retaining cutters on the cutter handle.
Figure 6:
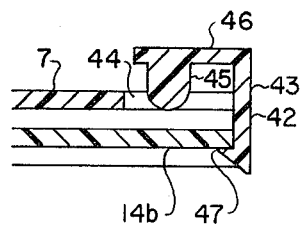
FIG. 6 is a fragmentary sectional view showing details of a modified form of retainer for retaining cutters on the cutter handle.

FIGS. 5 and 6 show retaining means somewhat similar to the retaining means shown in FIGS. 1 and 2. In FIG. 5, a wall 37 depends from the support 7. A finger engaging lug 38 is generally coplanar with the support member 7. The cutter member 14a has a through opening 39 which receives a portion of the wall 37 therethrough which has a ridge 40 thereon. It also has a tapered lead surface 41 which facilitates assembly of the dough cutter 1.

In FIG. 6, a wall 42 is hingedly articulated as at 43 to the support 7. The support 7 has an opening 44 therethrough for receiving a protuberance 45 to help eject a released cutter member 14b from retention. The lug 46 is connected to the wall 42 and is adapted for engagement by a finger to resiliently move a ridge 47 out of engagement with the cutter member 14b.

Figure 3:
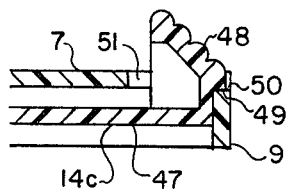
FIG. 3 is a fragmentary sectional view showing details of a modified form of retainer for retaining cutters on the cutter handle.
Figure 4:
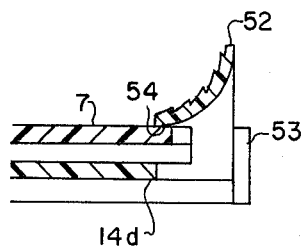
FIG. 4 is a fragmentary sectional view showing details of a modified form of retainer for retaining cutters on the cutter handle.

FIGS. 3 and 4 show retaining means which utilize a lug integral with a cutter. In the FIG. 3 form, the cutter member 14c has an integral upwardly projecting tab which is hingedly articulated as at 47. The lug 48 is adapted for finger engagement to resiliently move a shoulder 49 out of engagement with an edge or shoulder 50 of the rib 9. The lug 48 projects through an opening 51 in the support 7. Radial inward movement of the lug 48 effects release.

Similar to the FIG. 3 version, the version shown in FIG. 4 has a cutter member 14d with a resiliently movable lug 52 extending through an opening or slot 53 in the support 7. A shoulder 54 engages an upper surface of the support 7 and releasably retains the cutters in the receptacle 19. By moving the lug 52 generally radially outwardly, the shoulder 54 is moved out of engagement with the support 7 thereby permitting release of the cutters from the receptacle 19.

It is preferred that the cutting members 12 and 14 be formed of a resilient synthetic plastic resin, particularly for the forms of the invention shown in FIGS. 3 and 4, which utilize resilient movement of a lug 48 or 52 to effect release and retention of the cutters within the receptacle 19. It is also preferred for the other forms of the cutter that the cutters be formed of a synthetic plastic resin to facilitate manufacture preferably by injection modling.

With respect to the form of the retaining means shown in FIG. 1 and by having the handle 3 and base 4 as separate parts, radial inward movement of the lugs 29 urges the bottom surface 8 to bend and thus the ribs tend to assume a convex shape thereby facilitating forcing of the cutting members 12 and 14 out of the receptacle 19.

It is to be understood that while there has been illustrated and described certain forms of the present invention, it is not to be limited to the specific form or arrangement of parts hereindescribed and shown except to the extent that such limitations are found in the appended claims.

What is claimed is:

1. A cookie cutter for cutting a piece of dough of predetermined shape from a layer of dough, said cookie cutter comprising:
    a handle member having a hand engaging portion adapted to be grasped with the hand of a user and having retaining means for releasably retaining first and second cutting means on said handle member,
    first cutting means including a first cutting member with a first peripheral edge and having a first cutting rib secured to and extending from the first cutting member, said first cutting rib having a first end and a second end,
    second cutting means including a second cutting member with a second peripheral edge positioned adjacent to the first peripheral edge whereby said first and second cutting means are in side by side relationship when releasably retained by the retaining means on the handle member, said second cutting means having a second cutting rib secured to and extending from the second cutting member said second cutting rib having first and second ends whereby the first ends of the first and second cutting ribs are positioned adjacent one another and the second ends of the first and second cutting ribs are positioned adjacent one another when the cutting members are in side by side relationship that a substantially continuous cutting rib is formed which will cut dough and form an outer periphery of a cut dough piece.

2. A cookie cutter as set forth in claim 1 wherein:
    said peripheral edge and said second peripheral edge have generally mating contours whereby said first cutting member and said second cutting member form a substantially continuous surface from which said first cutting rib and said second cutting rib extend.

3. A cookie cutter as set forth in claim 2 including:
at least one wall secured to and extending from at least one of said cutting member and said second cutting member in generally the same direction as a respective said first cutting rib or said second cutting rib with said wall having a height less than the height of a respective said first cutting rib or said second cutting rib.

4. A cookie cutter as set forth in claim 1 or 2 including:
a plurality of ears secured to and projecting from at least one of the first and second cutting members and being generally parallel to a surface of the respective first or second cutting member from which the respective first or second cutting rib extends, said ears are in overlying relationship to a portion of the other of the first or second cutting member when same are releasably retained on the handle member.

5. A cookie cutter as set forth in claims 1 or 2 wherein said handle member includes:
a base member having opposite surfaces with the hand engaging portion mounted on the base member and extending from one of the surfaces, said base member having at least one rib extending from the other surface defining a receptacle for receiving the first and second cutting means therein and restricting lateral movement of the first and second cutting means.

6. A cookie cutter as set forth in claim 5 wherein said base member is of a molded resilient plastic resin and said retaining means includes:
a tab positioned between ends of said at least one rib and being selectively movable between a retaining position and a release position and being biased to said retaining position by material resilience, said tab having a latch portion which is generally coextensive with said at least one rib and having a ridge spaced from the other surface and extending into the receptacle to retain the first and second cutting means in the receptacle when the tab is in the retaining position, said tab having a lug extending in a direction generally upwardly and away from the one surface to allow a user to resiliently move the tab to the release position by pushing on the lug.

7. A cookie cutter as set forth in claim 6 wherein:
there is a plurality of said at least one rib each having opposite ends; and
there is a pair of said tabs positioned generally on opposite sides of said base member.

8. A cookie cutter as set forth in claim 6 wherein:
said ridge includes a shoulder which is generally parallel to the other surface, said ridge having a surface which extends in a direction from a lower free edge of the latch portion upwardly and inwardly forming a tapered lead in.

* * * * *